(12) United States Patent
Dipper et al.

(10) Patent No.: US 7,865,780 B2
(45) Date of Patent: Jan. 4, 2011

(54) METHOD FOR TEST CASE GENERATION

(75) Inventors: Stefan Dipper, Wiesloch (DE); Peter John, Heidelberg (DE)

(73) Assignee: SAP AG, Walldorf (DE)

( * ) Notice: Subject to any disclaimer, the term of this patent is extended or adjusted under 35 U.S.C. 154(b) by 392 days.

(21) Appl. No.: 11/868,369

(22) Filed: Oct. 5, 2007

(65) Prior Publication Data
US 2009/0094486 A1    Apr. 9, 2009

(51) Int. Cl.
G06F 11/00 (2006.01)
(52) U.S. Cl. .......................... 714/38; 714/39
(58) Field of Classification Search .......... 714/38, 714/37, 39; 717/124, 126, 128
See application file for complete search history.

(56) References Cited

U.S. PATENT DOCUMENTS

| 5,542,043 | A | * | 7/1996 | Cohen et al. | 714/32 |
| 5,913,023 | A | * | 6/1999 | Szermer | 714/38 |
| 6,889,199 | B2 | * | 5/2005 | Ramsey | 705/16 |
| 2003/0023396 | A1 | * | 1/2003 | Boehm | 702/119 |
| 2006/0101397 | A1 | * | 5/2006 | Mercer et al. | 717/120 |
| 2006/0179351 | A1 | * | 8/2006 | Nathan et al. | 714/38 |

* cited by examiner

*Primary Examiner*—Dieu-Minh Le
(74) *Attorney, Agent, or Firm*—Mintz, Levin, Cohn, Ferris, Glovsky & Popeo, PC

(57) ABSTRACT

A system and method for providing randomly-generated test cases for a set of interfaces of a piece of software are disclosed. A test case generator is initialized with parameter arrays $S_p$ with cardinality $m_p$ and a prime number $q_p$. For each independent parameter p of each of the set of interfaces, a test case number t is generated. A test case is then generated based on the values for each independent parameter p and based on t and $S_p$, $m_p$, and $q_p$.

9 Claims, 3 Drawing Sheets

Testcase generator initialization:
300

302 — Determine Parameter Arrays $S_p$ with cardinality $m_p$ for each parameter 304 — For each $S_p$ determine the the prime number $q_p$

Testcase Generation and Execution
400

402 — Determine testcase number t

404 — Determine actual testcase parameter values for each parameter P using t and the Arrays $S_p$, $m_p$ and $q_p$ 406 — Execute testcase t

FIG. 3

METHOD FOR TEST CASE GENERATION

BACKGROUND

This disclosure relates generally to test case generation for software testing.

Given a piece of software with an API or textual interface, in general two different approaches currently exist for testing the software. One approach includes defining test cases manually, as well as manual evaluation of test results. The other approach includes automatic generation of test cases. All possible input parameter combinations of an interface are called the "test area," number of possible combinations of input parameters of an interface increases exponentially with the number of input parameters. Thus, for large pieces of software, or those pieces of software having a large number of input parameters, it becomes challenging to generate a test case that adequately relates to the test area.

Automatically generated test cases should at least touch all parts of the test area. Therefore, automatically generated test cases must not correlate parameter values of independent parameters. Otherwise, the process by which the test cases are generated will systematically leave out parts of the test area. What is needed is a way to reach a statistically even coverage of the test area.

SUMMARY

In general, this document discusses a system and method for automatically generating a test case that reaches a statistically even coverage of the test area.

In one aspect, a system for providing randomly-generated test cases for a set of interfaces of a piece of software includes a test case number generator that generates a test case number. The system further includes a test case generator comprising a parameter value generator that deterministically generates a parameter value for each of a set of one or more parameters for each interface of the set of interfaces based on the test case number, the set of one or more parameter values providing a test case for a test area comprised of all possible parameter combinations for the set of interfaces.

In another aspect, computer implemented method for providing randomly-generated test cases for a set of interfaces of a piece of software includes steps of initializing a test case generator with parameter arrays $S_p$ with cardinality $m_p$ and a prime number $q_p$ for each independent parameter p of each of the set of interfaces, and generating a test case number t. The method further includes generating a test case based on the values for each independent parameter p and based on t and $S_p$, $m_p$, and $q_p$.

In yet another aspect, a method includes steps of generating a test case number t for a set of interfaces of a piece of software, and for each independent parameter p of each of the set of interfaces, generating a cardinality $m_p$ to be tested. The method further includes deterministically generating parameter values for each independent parameter p associated with $m_p$.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 3 is a flowchart of a method for generating a test case.

Like reference symbols in the various drawings indicate like elements.

DETAILED DESCRIPTION

This document describes a system and method for automatically generating a test case that reaches a statistically even coverage of a test area for a piece of software that has a number of input parameters to its API or textual interface.

Each test case is based on an integer, referred to herein as test case number t. All parameters whose values shall be determined randomly are deterministically generated from t. This allows rerunning a test case by just knowing its test case number. The range from which t is chosen should exceed the maximum cardinality of all parameter value sets S, and may also be negative.

For each independent parameter p the cardinality (number of values) to be tested is called $m_p$. The values are stored inside an array $S_p$. This allows using any kind of parameter types. The next prime number $q_p$ that is larger or equal to $m_p$ is determined. $S_p$, $m_p$ and $q_p$ are determined for each parameter during test initialization. Parameter values inside the arrays $S_p$ have to be chosen in a way that the number of values $m_p$ is different for all parameters p. Single parameter values might be statistically overweight by putting them into the array several times.

To determine the actual parameter value for a single test case with number t the index $n_p$ inside the array is determined according to the following rules:

$$n_p = t \bmod q_p + 1$$

$$\text{if } n_p > m_p \cdot n_p = n_p \bmod m_p$$

The actual parameter value in that case is the $n_p$ element of $S_p$. Thus, in order to reach a statistically even coverage of the test area, the test cases can be generated by generating the test case number t with a random number generator.

Of course this test case generation method can be applied to all kinds of interfaces, including text-based interfaces like SQL, as well as application program interfaces (APIs).

The following illustrates an example of the above-described system and method for randomly generated test cases. The function to be tested can be described as:

F(P1 int, P2 char01, P3 int)

Figure 1:
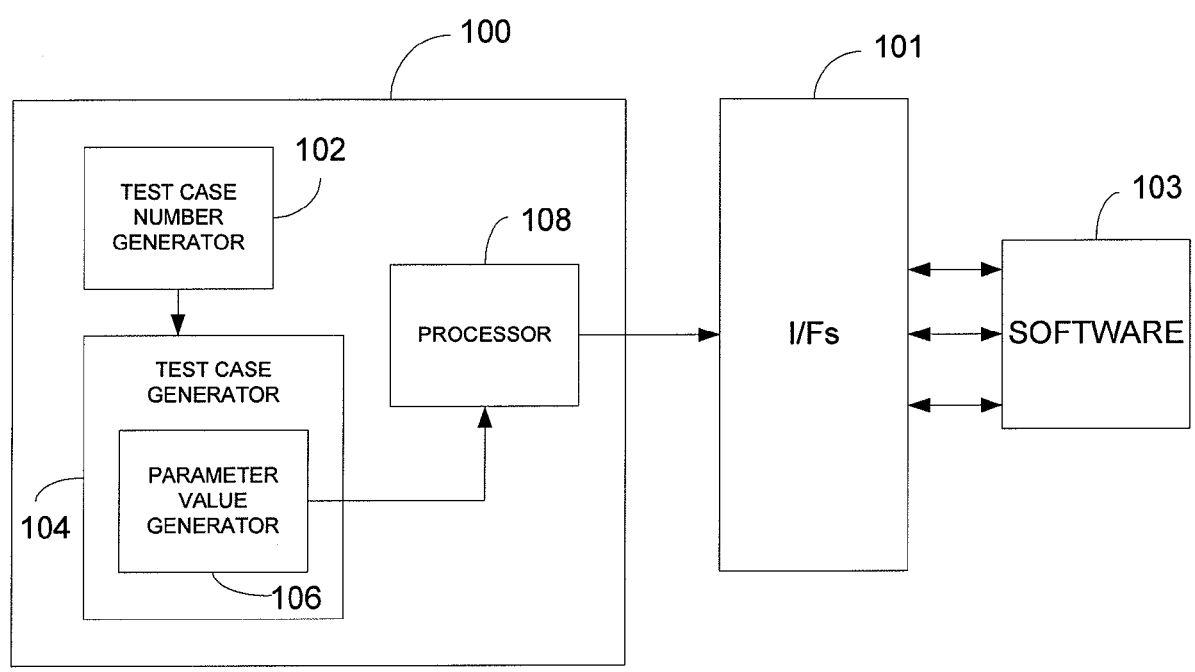
FIG. 1 is a functional block diagram of a test case generation system.
Figure 2:
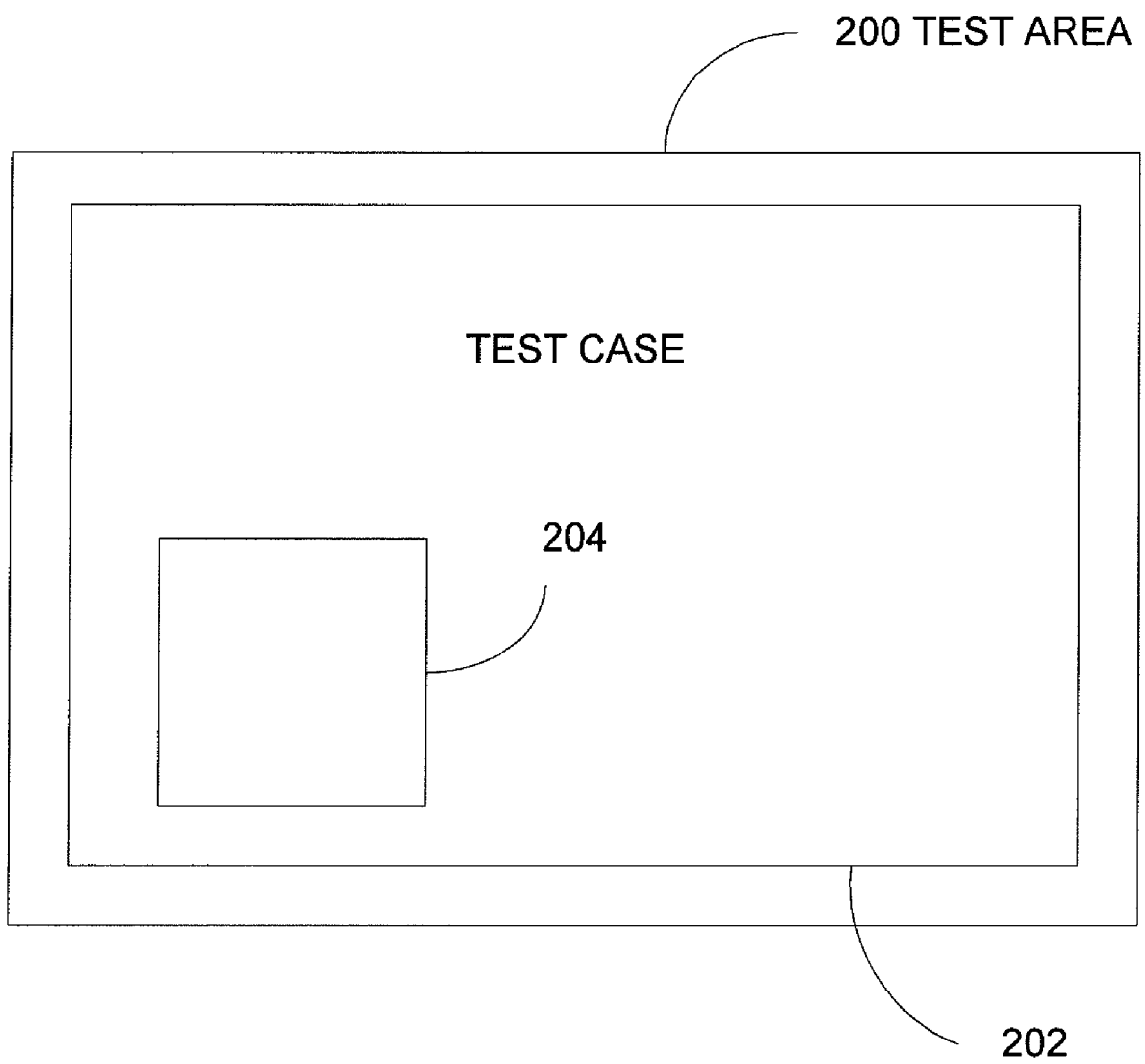
FIG. 2 graphically illustrates possible test coverages of test case generators in comparison to a test area that represents all possible parameter values of each parameter to be tested.

The test case generator is initialized with the following parameter value arrays:

Test values $S_1=\{1, 4, 7, 9, 11\}$ $m_1=5$ $q_1=5$
Test values $S_2=\{\text{'a', 'b', 'c', 'c', 'd', 'e'}\}$ $m_2=6$ $q_2=7$ ('c' was overweight)
Test values $S_3=\{2, 4\}$ m3=2 q3=2
For randomly-chosen test number t=47:
$P_1$: $n_1$=47 mod 5+1=3→Test value $P_1$=7
$P_2$: $n_2$=47 mod 7+1=6→Test value $P_2$='e'
$P_3$: $n_3$=47 mod 2+1=2→Test value $P_3$=4
For a test with test number t=20:
$P_1$: $n_1$=20 mod 5+1=1→Test value $P_1$=1
$P_2$: $n_2$=20 mod 7+1=7, 7−6=1→Test value $P_2$='a'
$P_3$: $n_3$=20 mod 2+1=1→Test value $P_3$=2
FIG. 1 illustrates a system 100 for providing randomly-generated test cases for a set of interfaces 101 of a piece of software 103. The system 100 includes a test case number generator 102 that generates a test case number t, as described above. The system 100 further includes a test case generator 104 that includes a parameter value generator 106. The parameter value generator 106 deterministically generates a parameter value for each of a set of one or more parameters for each interface of the set of interfaces based on the test case number. As graphically illustrated in FIG. 2, for a test area 200 that contains all possible parameter combinations for the set of interfaces, the test converage for a set of test cases 202 generated by a test case generator that generates all parameters independently from each other, can more closely approximate the test area 200 than the test coverage for a set of test cases 204 generated by a generator in which parameters are not independently generated. The test case 202 is then executed by a processor 108.

A system such as system 100 executes methods 300 and 400 for generating randomly-generated test cases for a set of interfaces of a piece of software. With method 300 the test case generator is initialized. During initialization at 302 for each parameter P the Array Sp is chosen in a way, that the cardinality $m_p$ is different for all Sps as described. The values in Sp are chosen in a way that they cover different regions of the test area.

At 304 the next prime number qp that is equal or greater than $m_p$ is determined.

With method 400 a single test case is created. At 402 a test case number t is generated. The range from which t is chosen should exceed the maximum cardinality of all parameter value sets S, and may also be negative. At 404 actual parameter values for the test case t are determined according to an algorithm below:

$$n_p = t \bmod q_p + 1$$

$$\text{if } n_p > m_p, n_p = n_p \bmod m_p$$

where each actual parameter value is the $n_p$ element of array $S_p$. Accordingly, the test case can be executed at 406 to test the interfaces of the piece of software.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the test case generation system and method described above can be applied to all types of interfaces, including text-based interfaces such as SQL, as well as application programming interfaces (APIs).

The steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for providing randomly-generated test cases for a set of interfaces of a piece of software, the system comprising:
   a random test case number generator that generates a test case number; and
   a test case generator comprising a parameter value generator that deterministically generates a parameter value for each of a set of one or more parameters for each interface of the set of interfaces based on the test case number, the set of one or more parameter values providing a test case for a test area comprised of all possible parameter combinations for the set of interfaces, the test case generator being configured to select parameter values that are independent for all parameters in the set of one or more parameters.

2. A system in accordance with claim 1, further comprising a processor configured to run the test case for the set of interfaces.

3. A system in accordance with claim 1, wherein the test case generator is further configured to store the parameter values into an array in a memory.

4. A system in accordance with claim 1, wherein the test case generator is further configured to provide a cardinality for each parameter in the set of one or more parameters.

5. A computer implemented method for providing randomly-generated test cases for a set of interfaces of a piece of software, the method comprising:
   initializing a test case generator with parameter arrays $S_p$ with cardinality $m_p$ and a prime number $q_p$ for each independent parameter p of each of the set of interfaces;
   generating a test case number t;
   generating a test case based on the values for each independent parameter p and based on t and $S_p$, $m_p$, and $q_p$;
   determining a prime number $q_p$ that is equal to or larger than $m_p$; and
   determining actual parameter values for each parameter p of an interface for the test case t according to an algorithm comprising:

$n_p = t \bmod q_p + 1$ if $n_p > m_p$, $n_p = n_p \bmod m_p$ where each actual parameter value is the $n_p$ element of parameter value array $S_p$.

6. A computer implemented method in accordance with claim 5, wherein generating the test case further comprises selecting $m_p$ that is different for all parameters p.

7. A computer implemented method in accordance with claim 5, further comprising executing the test case on the set of interfaces of the piece of software.

8. A method comprising:
   generating a test case number t for a set of interfaces of a piece of software;
   for ea1ch independent parameter p of each of the set of interfaces, generating a cardinality $m_p$ to be tested;
   deterministically generating parameter values for each independent parameter p associated with $m_p$;
   storing the parameter values in an array in a memory;
   generating a test case for the set of interfaces based on t and $m_p$;
   determining a next prime number $q_p$ that is equal to or larger than $m_p$; and
   determining actual parameter values for the array according to an algorithm comprising:

$n_p = t \bmod q_p + 1$ if $n_p > m_p$, $n_p = n_p \bmod m_p$ where each actual parameter value is the $n_p$ element of parameter value array $S_p$.

9. A method in accordance with claim 8, further comprising executing the test case on the set of interfaces of the piece of software.

* * * * *